(12) United States Patent  
Pena et al.

(10) Patent No.: US 12,170,722 B1  
(45) Date of Patent: *Dec. 17, 2024

(54) SYSTEMS AND METHODS FOR SELECTIVELY SENDING ENCRYPTION KEYS

(71) Applicant: United Services Automobile Association (USAA), San Antonio, TX (US)

(72) Inventors: Ric M. Pena, Boerne, TX (US); Arthur Quentin Smith, Fredericksburg, TX (US); Brian Tougas, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,894

(22) Filed: Apr. 13, 2023

Related U.S. Application Data

(63) Continuation of application No. 16/945,178, filed on Jul. 31, 2020, now Pat. No. 11,658,809.

(51) Int. Cl.
| | |
|---|---|
| *H04L 9/08* | (2006.01) |
| *G06F 21/62* | (2013.01) |
| *G06Q 20/12* | (2012.01) |
| *H04L 67/50* | (2022.01) |
| *H04L 67/53* | (2022.01) |

(52) U.S. Cl.
CPC ............ *H04L 9/0819* (2013.01); *G06F 21/62* (2013.01); *G06Q 20/1235* (2013.01); *H04L 9/088* (2013.01); *H04L 9/0894* (2013.01); *H04L 67/53* (2022.05); *H04L 67/535* (2022.05); *G06Q 2220/12* (2013.01)

(58) Field of Classification Search
CPC ..... H04L 9/0819; H04L 67/53; H04L 67/535; H04L 9/088; H04L 9/0894; G06F 21/62; G06Q 20/1235  
See application file for complete search history.

(56) References Cited

U.S. PATENT DOCUMENTS

| | | |
|---|---|---|
| 6,480,096 B1 | 11/2002 | Gutman et al. |
| 8,213,426 B2 | 7/2012 | Zampiello |
| 8,213,620 B1 | 7/2012 | Sussland et al. |
| 11,563,568 B2 * | 1/2023 | Park ...................... H04L 9/0819 |
| 2002/0010757 A1 * | 1/2002 | Granik .................. G06F 16/955 |
| | | 707/E17.112 |
| 2004/0037424 A1 * | 2/2004 | Numao ................... H04L 9/083 |
| | | 380/277 |
| 2007/0204349 A1 * | 8/2007 | Sparks ................ H04L 63/0442 |
| 2009/0092139 A1 * | 4/2009 | Coley ..................... H04L 65/80 |
| | | 370/395.4 |
| 2009/0144204 A1 * | 6/2009 | Hurry .................... G06Q 20/14 |
| | | 705/73 |

(Continued)

*Primary Examiner* — Shanto Abedin  
(74) *Attorney, Agent, or Firm* — Fletcher Yoder, PC

(57) ABSTRACT

A technique for selectively sending encryption keys is provided that encrypts user data generated as a result of a user interacting with a user device. The encrypted user data may be sent to one or more target devices associated with a third party. When the one or more target devices are authorized to receive an encryption key, the encryption key to decrypt the encrypted user data may also be sent to the one or more target devices.

20 Claims, 4 Drawing Sheets

(56) References Cited

U.S. PATENT DOCUMENTS

| | | | |
|---|---|---|---|
| 2013/0318347 A1* | 11/2013 | Moffat | H04L 63/0435 |
| | | | 713/168 |
| 2014/0032267 A1 | 1/2014 | Smith et al. | |
| 2015/0310457 A1 | 10/2015 | Smith | |
| 2017/0230344 A1* | 8/2017 | Dhar | H04L 9/088 |
| 2019/0303967 A1* | 10/2019 | Wijaya | H04L 67/306 |
| 2019/0340264 A1* | 11/2019 | Yu | G06F 16/172 |
| 2019/0342083 A1 | 11/2019 | LeSaint | |
| 2022/0060514 A1* | 2/2022 | Hu | H04L 9/3213 |

* cited by examiner

SYSTEMS AND METHODS FOR SELECTIVELY SENDING ENCRYPTION KEYS

CROSS REFERENCES TO RELATED APPLICATIONS

This application is a Continuation of U.S. patent application Ser. No. 16/945,178, entitled "Systems and Methods for Selectively Sending Encryption Keys," filed Jul. 31, 2020, which is hereby incorporated by reference in its entirety.

BACKGROUND

The present disclosure relates generally to systems and methods for selective data sharing. More specifically, the present disclosure relates to techniques to selectively providing an encryption key to a third-party target device to decrypt encrypted user data.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

While a user utilizes a computing device, the computing device may generate user data in response to certain actions performed by the user. For example, the computing device may generate user data when the user submits a search query using a search engine, selects actionable items (e.g., buttons, hyperlinks, hypertext, and the like) on a webpage or application, visits websites, selects vendors or interests on social media, and the like. At least in some instances, the user data may be sent to third-party data aggregators that sell the user data and/or analyze the user data to generate user data analytics which may be sold to another third party. In any case, the user data and/or user data analytics may ultimately be used to determine content and/or advertisements to send to the user and/or other users based on correlations between components within the user data, such as demographic information (e.g., age, race, sex, and the like), temporal data (e.g., time of day, months, seasons, and the like), and content the user and/or other users may be interested in. However, the user may not want the third-party data aggregators or the third party to send certain content or advertisements.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to an electronic device that includes a processor. The electronic device also includes a tangible, non-transitory, computer-readable medium, having instructions executable by the processor. The instructions include receiving an indication to send user data to a target device. The instructions also include generating an encryption key associated with the user data in response to receiving the indication. Further, the instructions include encrypting the user data with the encryption key to generate encrypted user data. Even further, the instructions include sending the encrypted user data to the target device. Further still, the instructions include determining whether the target device is authorized to receive the encryption key. The instructions also include sending the encryption key to the target device in response to determining that the target device is authorized to receive the encryption key.

In another embodiment, the present disclosure relates to a method. The method includes setting, via a processor, a first price associated with user data generated using the processor to be sent to a target device. The method also includes receiving, via the processor, an indication to send the user data to the target device. Further, the method includes generating, via the processor, an encryption key associated with the user data in response to receiving the indication. Even further, the method includes encrypting, via the processor, the user data with the encryption key to generate encrypted user data; sending, via the processor, the encrypted user data to the target device; receiving, via the processor, a second price from the target device; determining, via the processor, that the set price is accepted based on a comparison between the first price and second price; and sending, via the processor, the encryption key to the target device in response to determining that the price is accepted.

In another embodiment, the present disclosure relates to a tangible, non-transitory, machine-readable medium comprising instructions that, when executed by a processor, cause the processor to perform operations including generating an encryption key in response to user data being generated on a computing device. The operations also include setting a price associated with the user data based on a plurality of types of information associated with the user data. Additionally, the operations include encrypting the user data with the encryption key to generate encrypted user data. Further, the operations include sending the encrypted user data to a target device. Further still, the operations include determining whether the target device is authorized to receive the encryption key based on the price. Even further, the operations include sending the encryption key to the target device in response to determining that the target device is authorized to receive the encryption key.

DRAWINGS

These and other features, aspects, and advantages of the present disclosure will become better understood when the following detailed description is read with reference to the accompanying drawings in which like characters represent like parts throughout the drawings, wherein.

Figure 3:
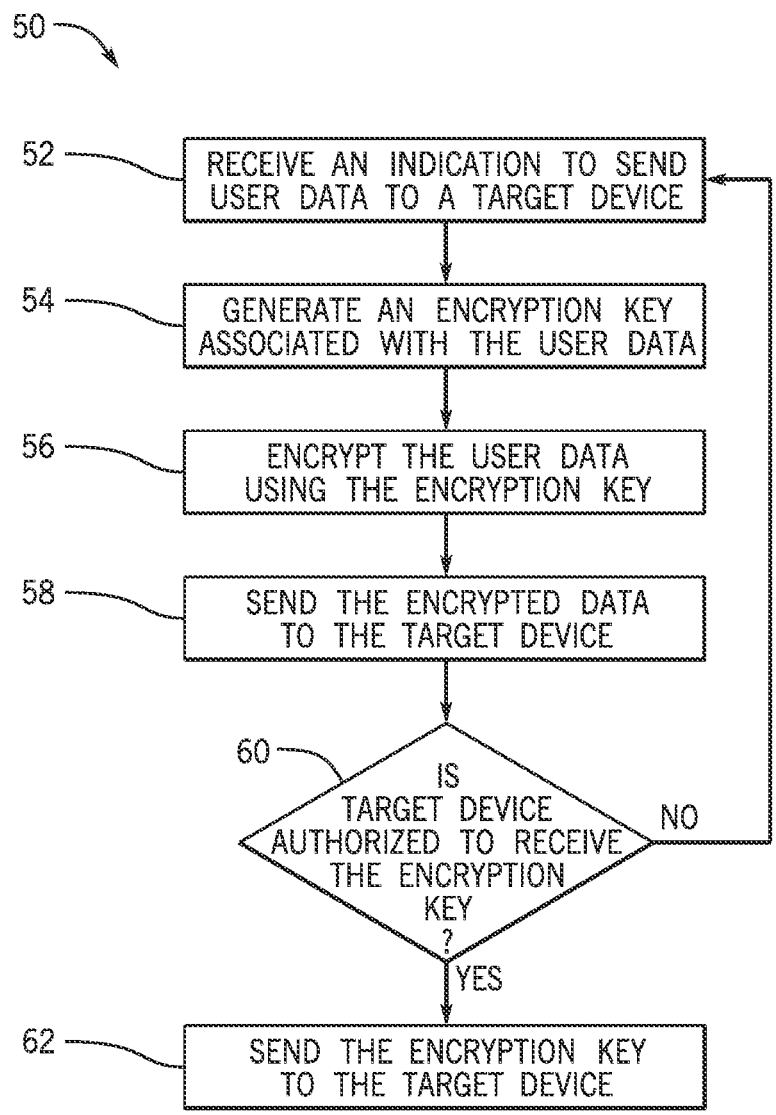
Figure 4:
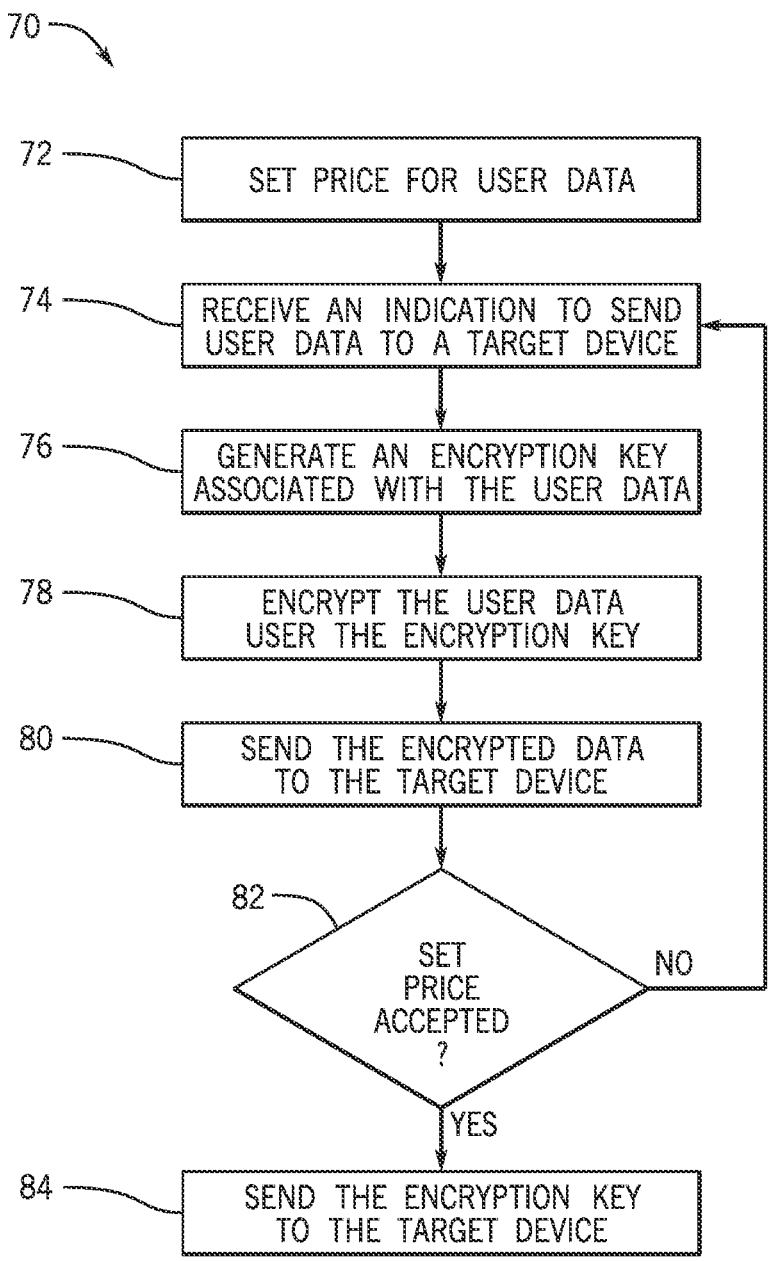

FIG. 3 illustrates a flow diagram for selectively sending an encryption key to a third-party target device to decrypt encrypted user data based on an input from a user, in accordance with embodiments described herein; and FIG. 4 illustrates a flow diagram for selectively sending an encryption key to a third-party target device to decrypt encrypted user data based on a price associated with the encrypted user data, in accordance with embodiments described herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "some embodiments", "one embodiment", or "an embodiment" of the present disclosure are not intended to be interpreted as excluding the existence of additional embodiments that also incorporate the recited features.

As used herein, the term "application" refers to one or more computing modules, programs, processes, workloads, threads, and/or computing instructions executed by a computing system. Example embodiments of an application include software modules, software objects, software instances, and/or other types of executable code. As referred to herein, "user data" may include data associated with and/or identifying a user. In some embodiments, user data may include data that relates the actions performed by the user while utilizing the computing device, with information associated with and/or identifying the user. For example, user data may include an indication of the actions performed by the user (e.g., a website opened, an application accessed, a file downloaded, a link associated with a product that the user selected, and the like), user identity data (e.g., IP address, email, and the like), or demographic information of the user (e.g., age, race, location, and the like).

To protect the privacy of the user, certain software applications may encrypt the user data before the user data is sent to a database associated with the third party. As such, the user data may be unusable by the third party, which may prevent the user from receiving targeted content or advertisements. It is presently recognized that it may be advantageous for the user to allow or deny utilization by the third party of at least a portion of the user data for certain analytics. For example, the user may desire to receive certain targeted content or advertisements associated with certain hobbies or interests of the user (e.g., sales on certain types of products, advertisements for certain brands, and notifications of upcoming product releases). Additionally, while the user data may indicate other hobbies or interests of the user, the user may not wish to receive targeted content or advertisements associated with the other hobbies or interests (e.g., political affiliations, religious affiliations, social causes). Further, it may be advantageous for the user to sell a portion of the user data to the third-party aggregators. Accordingly, embodiments of the present disclosure relate to selectively sending encryption keys associated with encrypted user data. That is, the user may determine when or in what situations to send an encryption key to a third party, which enables the third party to decrypt the encrypted user data and utilize the user data for sale and/or generating user data analytics. In this way, the user may benefit by deciding what type of targeted content or advertisements may be sent to the user, thereby improving the user's efficiency in locating products. Moreover, the user may financially benefit by selling the user data via selectively sending the encryption key.

Figure 1:
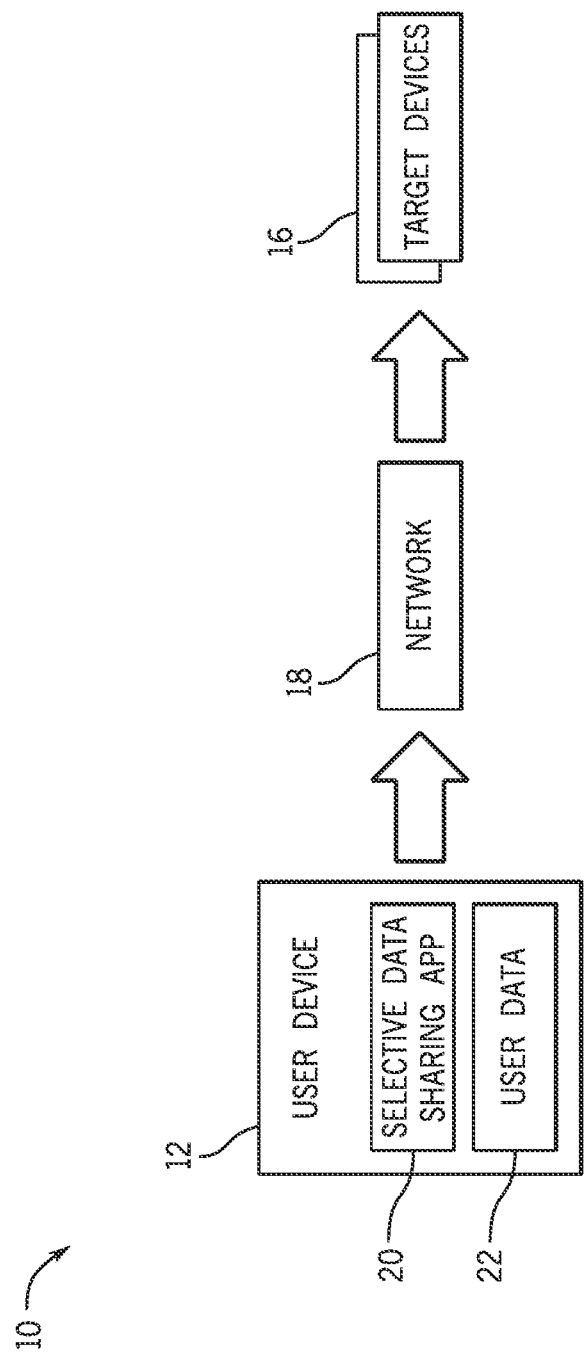
FIG. 1 illustrates a block diagram of a selective data sharing system, in accordance with embodiments described herein.

With the foregoing in mind, FIG. 1 is a block diagram of a selective data sharing system 10 that includes a user device 12, one or more target devices 16, and a network 18, in accordance with embodiments described herein. The user device 12 may include an electronic device having a processor to perform one or more operations described herein. The user device 12 may be worn, held, or associated with the property owner that may be used to send and receive data and/or receive inputs from the property owner. For example, the user device 12 may be a personal computer, laptop computer, tablet computer, smart phone, and so. The user device 12 may be in communication with other user devices 12 and receive the initial indication via an interface of the user device 12. As illustrated and discussed in further detail below, the user device 12 may store a selective data sharing application 20, as well as store and generate user data 22.

The target devices 16 may include electronic devices similar to the user device 12, such as a personal computer, laptop computer, tablet computer, smart phone, and so on. Moreover, the target devices 16 may include electronic devices of a third party that request the user data to utilize in certain analytics or to determine target content and advertisements to send the user.

In general, the selective data sharing application 20 may include an application having instructions executable by a processor of the user device 12 to generate an encryption key, encrypt the user data 22 using the encryption key, send the encrypted user data to the one or more target devices 16, and selectively send the encryption key to the one or more target devices 16 based on, for example, user input. As referred to herein, the encryption key is generally information that determines an output of a cryptographic algorithm (e.g. cipher). That is, the encryption key specifies the transformation of data (e.g., the user data) to an encrypted data (e.g., encrypted user data). As discussed in more detail below, the selective data sharing application 20 may enable the user device 12 to selectively send the encryption key based on user input, and thus enable the target device 12 to utilize the user data 22 at the discretion of the user.

In one embodiment, the user device 12 (e.g., specifically, the processor 30 of the user device 12) may send encrypted user data associated with user data 22 in response to the user data 22 being generated by the user device. It should be understood that, as described herein, any actions performed by the user device 12 may include actions that are specifically performed by the processor 30 of the user device 12. The user data 22 may include cookies generated by the user device 12 (e.g., downloaded from a website) in response to the user utilizing a web browser. The user device 12 may generate an encryption key to encrypt a payload of the cookies, which may indicate a record of one or more websites visited by the user while utilizing the web browser, particular buttons on one or more websites selected by the user, a time associated when the user accessed the one or more websites, and the like. Once the encryption key is generated, the user device 12 may encrypt the payload of the cookies using the encryption key to generate encrypted user data and send the encrypted user data to the target device. More specifically, the user device 12 utilizes the encryption key to convert the original representation of user data into an encoded form (e.g., the encrypted data) based on an encryption algorithm, which renders the user data unusable by a third party, unless the third party has the encryption key.

In some embodiments, the user device 12 (e.g., specifically, the processor 30 of the user device 12) may prompt a user associated with the user device 12 to provide an input (e.g., an authorization) indicating whether or not to send the encryption key to a target device (e.g., a third-party target device). For example, the user device 12 may output a control signal causing a display of the user device 12 to display one or more buttons for the user to select indicating whether or not to send the encryption key. Additionally, the user device 12 may display user data information on a display of the user device 12 that may inform the user of what the user data 22 contains, is associated with, and so on. For example, the user data information may include a summary of the user data used to generate the encrypted user data, such as a description of websites visited, an indication of the time or time range when the user accessed the websites, the buttons selected, keywords search, and the like. In another embodiment, the user device 12 may prompt the user to decide whether or not to send the encryption(s) to the target device 16 in response to receiving an indication from the target device 16 that the third party wants to use the user data 22.

In another embodiment, the user device 12 (e.g., specifically, the processor 30 of the user device 12) sends encrypted user data periodically. For example, the user device 12 may send the encrypted user data after a predetermined time period has elapsed (e.g., every second, 5 seconds, minute, 5 minutes, 10 minutes, 1 hour, 2 hours, 3 hours, or 4 hours, at time periods selected by the user, and the like), and/or when a predetermined amount of user data 22 has been generated (e.g., corresponding to a target amount of data that the user device may send corresponding to a particular price, as described in further detail below). In some embodiments, the user device 12 may prompt the user to indicate whether to send an encryption key once the predetermined amount of user data 22 has been generated. For example, once an amount of user data 22 corresponding to a monetary value (e.g., predetermined or provided by the user) has been generated, the user device 12 may output a control signal that causes a display of the user device 12 to display a user selectable control (e.g., a button) enabling the user to confirm whether to send or not send the encryption key(s). It should be noted that the predetermined time period and/or the predetermined amount of user data 22 may be defined by the user, defined by a developer of the selective data sharing application 20, determined based on activity trends of the user, and the like. In any case, the user device 12 may generate the user data 22 in response to actions performed by the user device 12 and store the user data 22 in a memory or storage of the user device. When the predetermined time period has elapsed and/or an amount of user data 22 stored in the memory of the user device 12 is above a storage threshold, the user device 12 may encrypt the user data 22 and send the encrypted user data to the one or more target devices 16. In some embodiments, the user device 12 may aggregate the encrypted user data, or aggregate the user data and subsequently encrypt the aggregated user data, to generate aggregate encrypted user data.

In any case, the user device 12 may prompt the user to provide an input (e.g., via an input device such as touchscreen, mouse, keyboard, and the like) indicating whether or not to send the encryption key(s) to the target device 16, such as by providing user data information on a display of the user device and a user selectable control (e.g., a button) to send or not send the encryption key(s). For example, the user data information may be a summary of the encrypted payload or aggregate user data. In another embodiment, the user device 12 may prompt the user associated with the user device 12 to provide an input indicating whether or not to send the encryption (s) to the target device 16 in response to receiving an indication from the target device 16 that the third party wants to use the user data associated with the encrypted user data.

Additionally or alternatively, the user device 12 may automatically determine whether or not to send the encryption key based on user-defined criteria and/or filter data, such as keywords included in the user data 22, a time frame when the user data 22 was generated and/or encrypted, a name of companies associated with the third party, and the like. In general, the filter data and/or user-defined criteria may indicate when the user does or does not want to send data for use by third parties. For example, the user may desire to transmit user data indicative of certain hobbies of interest to the user (e.g., bicycles). As such, the filter data may include brands of bicycles. As another non-limiting example, the user may only want to transmit user data during the day, which may correspond to when the user is using the user device 12 for work or non-work related activities, during certain sale periods (e.g., before or after holidays), and so on. Accordingly, the filter data may be a time frame (e.g., 5:00 pm to 11:59 pm) when the user wants to transmit user data that is not associated with work-related activities. Similarly, the user may provide filter data indicative of when or what type of user data the user does not want to send.

In some embodiments, the user device 12 may prompt the user to provide an input indicating the user-defined criteria. For example, in response to detecting a new application installed on the user device 12, the user device 12 may prompt the user to provide an input indicating keywords and/or filter data to determine whether to send the encryption key and the encrypted user data, or to send the encrypted user data and not the encryption key. When the user device 12 generates user data 22 that contains a string, time data, and/or metadata that correlates to or matches the filter data provided by the user, the user device 12 may transmit the encryption key. Continuing with the example of when the filter data includes certain brands of bicycles, the user device 12 may transmit an encryption key associated with previously transmitted encrypted user data in response to determining that the user data 22 includes words or phrases that match the filter data. As such, this may provide certain financial benefits to the user, such as knowing of deals associated with the products (e.g., bicycles) that match the filter data. In another example, the user device 12 may send the user data 22 while the user is using a certain application and/or during certain time periods (e.g., in the mornings, afternoon, and evenings). In another example, the user device 12 may send the encryption key to certain target devices 16 that the user authorized based on user input.

In another embodiment, the user device 12 may send the encryption key based on a price set by the user, the third party, and/or as determined by the user device 12. For example, the user device 12 may prompt the user for a price associated with one or more user data, and associate, sell, or offer to sell the one or more user data based on the price. The price may be an amount, such as expressed in cents, dollars, fractions of a dollar ($0.1, $0.001, $0.001), a percentage of profits that the third party may gain based on the user data 22, and so on. In another example, the user device 12 may prompt the user for the price in response to generating the user data 22, after a pre-determined time period, in response to detecting that a new application is installed on the user device 12, and the like. It should be noted that the user device 12 (e.g., the selective data sharing application 20) may be linked to one or more financial accounts of the user (e.g., bank accounts, mobile payment service applications, and financial management accounts). As such, the user device 12 may use the one or more financial accounts for depositing any financial gains earned by selling the user data 22.

In some embodiments, the user device 12 may determine a price based on temporal data. In general, the temporal data indicates a time period when the user data was captured, seasonal information (e.g., holiday sales), and/or fiscal time periods of a company that is relevant to the user data, and/or an overlap between the time period when the user data was captured and the seasonal information and/or the fiscal time periods. For example, if the user data 22 from a first time period indicates that the user is looking for a car and a company that will use the user data 22 is a car dealership that desires to sell older car models within a second time period (e.g., having relatively narrow time frame corresponding to when a new car model has been released), the temporal data may indicate the first time period (e.g., one month after, until the end of the year, under the end of a fiscal quarter), the second time period, or both, and/or an overlap between the first time period and the second time period. Either time period (e.g., the first time period or the second time period) may be predetermined and/or provided by the user and/or company, or determined by the user device 12 based on trends from the company and/or companies selling similar products. As such, if there is overlap between the first time period and the second time period, the user device 12 may set the price of the user data to a relatively higher amount than a set price associated with when the car dealership has a more flexible time period (e.g., setting the price based on temporal data for a company that may use the data). That is, the more flexible time period may correspond to a first time period (e.g., days, weeks, months) occurring before a second time period that corresponds to or ends with a fiscal or sales goal of the company (e.g., the end of a fiscal quarter, the end of the month, a release date of a new version of a product). As such, the company may be more likely to purchase the user data during the second time period (e.g., a less flexible time period) for a higher price than during the first time period (e.g., the more flexible time period) due to an increase in demand of the user data during the second time period.

As another non-limiting example, the user device 12 may determine a price based on location data. For example, the location data may indicate a distance from a dwelling of the user and multiple companies selling a product associated with the user data 22. The user device 12 may set the price of the user data to a relatively higher price for companies that are closer to the dwelling of the user (e.g., that the user is more likely to visit) than companies that are further from the dwelling of the user. In some embodiments, the price may reflect a fixed amount for an amount of user data. In any case, the user device 12 may prompt the user to accept or reject the set price. In some embodiments, the user device 12 may send the price to the target device 16 to enable the third party to decide whether or not to accept the price. When the price is accepted, the user device 12 may send the encryption key to the target device 16.

In some embodiments, the user device 12 may send the encryption key based on a price set using a bid system. That is, the user device 12 may send the encryption key to a third party that provides the highest bid for the user data 22 or provides a bid that exceeds a target or minimum price provided by the user within a time frame. For example, the user may provide a target or minimum price to sell the user data 22 and a time frame for selling the user data 22. As such, at the end of the time frame, the user device 12 may send the encryption key to the target device 16 associated with the third party that provided the highest bid or the bid that exceeded the target or minimum price provided by the user. In some embodiments, the user device 12 may transmit the user data 22 at a particular price point. That is, the user device 12 may transmit the encryption key when the bid is greater than or equal to the particular price point. In some embodiments, the selective data sharing application 20 may negotiate the price on behalf of the user. For example, the data sharing application 20 may determine whether to sell the user data 22 based on parameters set by the user (e.g., a time period of when to lower a price, a time period of when to raise a price based on temporal data, location data, and/or demographic data, an amount of internet traffic related to a website the data may be used for, the company that may use the data).

Figure 2:
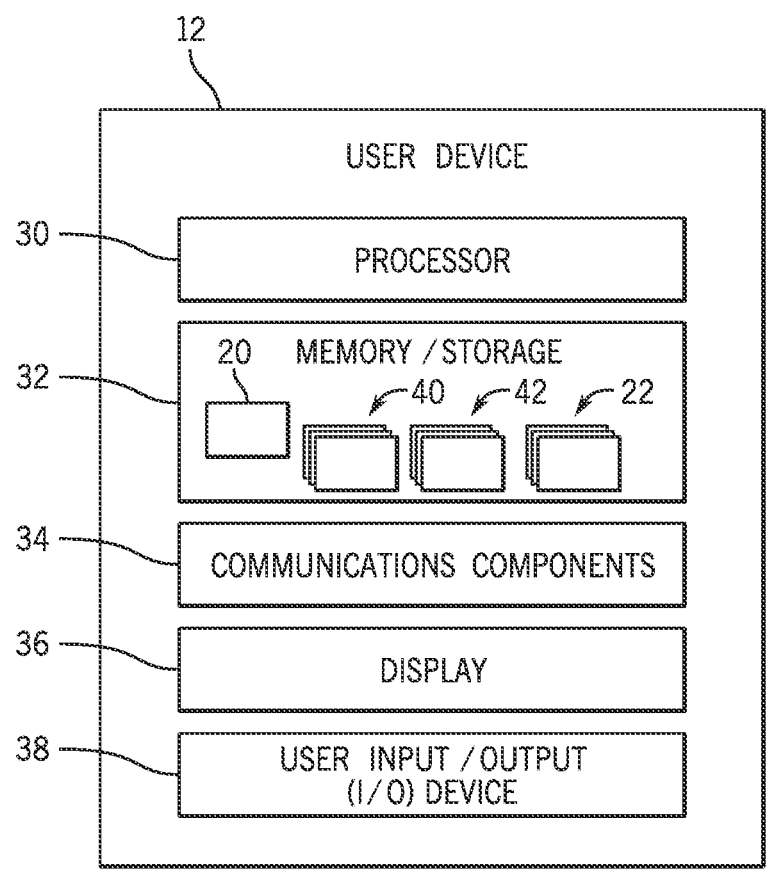
FIG. 2 illustrates a block diagram of a computing system that may be used in conjunction with the system of FIG. 1, in accordance with embodiments described herein.

To perform one or more operations described herein, the user device 12 may include various types of components that may assist the user device 12 in performing the operations described below. For example, as shown in FIG. 2, the user device 12 may include a processor 30, memory/storage 32, a communication component 34, a display 36, input/output (I/O) port 38, and the like, in accordance with embodiments described herein.

The processor 30 may be any type of computer processor or microprocessor capable of executing computer-executable code. The processes and logic flows described in this specification may be performed by one or more programmable processors executing one or more computer programs to perform functions by operating on input data and generating output. The processes and logic flows may also be performed by special purpose logic circuitry, e.g., an FPGA (field programmable gate array) or an ASIC (application specific integrated circuit). Processors suitable for the execution of a computer program include, by way of example, both general and special purpose microprocessors, and/or processor(s) of any appropriate kind of digital computer.

The memory and the storage 32 may be any suitable articles of manufacture that store processor-executable code, data, or the like. These articles of manufacture may include non-transitory computer-readable media (e.g., any suitable form of memory or storage) that may store the processor-executable code used by the processor 30 to perform the presently disclosed techniques. As used herein, applications may include any suitable computer software or program that may be installed onto the user device 12 and executed by the processor 30. It should be noted that non-transitory merely indicates that the media is tangible and not a signal. As illustrated, the memory and the storage 32 may store the selective data sharing application 20, one or more user data 22, one or more encryption keys 40, and one or more applications 42. In general, as the processor 30 encrypts user data 22 using an encryption key 40, the processor associates the encryption key 40 with the encrypted data. Additionally, the processor 30 may associate the encryption key 40 with one or more applications (e.g., which, in turn, may be associated with the user data 22). Further, the memory and the storage 32 may also store the encrypted user data (not shown). The processor 30 may track associations between user data 22 and applications. Moreover, the processor 30 may associate user data 22 and/or applications with third parties and/or third-party aggregators that are selected to receive encryption keys 40.

The communication component 34 may be a wireless or wired communication component that may facilitate communication between the user device 12, and various other computing systems via the network 18, the Internet, or the like. The display 36 may depict visualizations associated with software or executable code being processed by the processor 30. The display 36 may be any suitable type of display, such as a liquid crystal display (LCD), plasma display, or an organic light emitting diode (OLED) display. Additionally, in one embodiment, the display 36 may be provided in conjunction with a touch-sensitive mechanism or touch display (e.g., a touch screen) that may function as part of a control interface for the user device 12 and be capable of receiving inputs from a user of the control system 20. The I/O ports 38 may be interfaces that may couple to other peripheral components such as input devices (e.g., keyboard, mouse), the input/output (I/O) devices 38, and the like. For example, to provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

FIG. 3 illustrates an example process 50 that may be employed by the user device 12 to selectively send an encryption key 40 based on a determination of whether one or more target devices 16 that received the user data 22 are authorized to receive the encryption key 40, in accordance with embodiments described herein. For example, the steps of the process 50 may be stored in the selective data sharing application 20. Before proceeding, it should be noted that the process 50 described below is described as being performed by the processor 30 of the user device 12, but the process 50 may be performed by other suitable computing devices. Although described in a particular order, which represents a particular embodiment, it should be noted that the process 50 may be performed in any suitable order. Additionally, embodiments of the process 50 may omit process blocks and/or include additional process blocks.

Referring now to FIG. 3, at block 52, the processor 30 receives an indication to send the user data 22. In general, the indication may indicate that user data 22 has been generated. For example, the indication may include a request from a target device 16 for user data 22, inputs provided by an input device (e.g., a mouse click, a refresh button, and the like) when a website or application is being utilized, or user data 22 generated by the user device 12. In one embodiment, the indication may include cookies, and the processor 30 may receive the indication when cookies are generated in response to the user device 12 communicating with a website. In another example, the indication may include the user data 22, and the processor 30 may receive the indication each time user data 22 is generated. In some embodiments, the indication may include a request from the target device 16 to the user device 12 for the user data 22 and/or encryption key 40. In some embodiments, the indication may be received each time the target device 16 uses or attempts to use the data. In additional or alternative embodiments, the encryption key 40 may be requested by an application (e.g., associated with the third party) by accessing a virtual IP address, thereby protecting the location information of the user. In some embodiments, the processor 30 may receive the indication each time a user clicks links or actionable content on a website or application (e.g., associated with shopping, social media, news, and the like).

At block 54, the processor 30 generates an encryption key 40 associated with the user data 22. As discussed herein, the encryption key 40 is generally information that determines an output of a cryptographic algorithm (e.g. cipher). That is, the encryption key 40 specifies the transformation of data (e.g., the user data 22) to encrypted data (e.g., encrypted user data). In some embodiments, the processor 30 may generate the encryption key 40 in response to receiving the indication to send the user data 22. In other embodiments, the processor 30 may generate the encryption key 40 each time user data 22 is generated. In any case, the encryption key 40 may be stored in the memory and/or storage 32 of the user device 12, or any other suitable computing device, where it may be selectively transmitted to a target device 16.

At block 56, the processor 30 encrypts the user data 22 using the encryption key 40. As discussed above, to encrypt the user data 22, the processor 30 may utilize the encryption key 40 with an encryption algorithm to convert the original representation of user data into an encoded form (e.g., the encrypted data), which renders the user data 22 (e.g., specifically as encrypted user data) unusable by a third party, unless the third party has the encryption key 40. The memory and/or storage 32 may store algorithms that may be utilized by the processor 30 to generate the encrypted user data. At block 58, the processor 30 sends the encrypted user data to one or more target devices 16. In some embodiments, the processor 30 may wait to send the encrypted user data and/or aggregated encrypted user data, such as during a time period when the user is not using the user device 12 (e.g., as detected by the user device 12, or when the user device 12 is in a sleep or low power mode), so as not to utilize excessive memory resources on the user device 12. As discussed herein, the one or more target device 16 may be associated with third parties that desire to utilize the data for analytics and/or generating targeted content or advertisements.

At block 60, the processor 30 determines whether the one or more target devices 16 that received the user data 22 are authorized to receive the encryption key 40. For example, the processor 30 may prompt the user for user input to indicate whether or not to send the encryption key 40. As discussed herein, in some embodiments, the processor 30 may also cause the display 36 to provide summary information associated with the encrypted data to be sent, which may help inform the user to make a decision. Additionally or alternatively, the processor 30 may determine whether to send the encryption key by comparing the user data to filters data provided by the user, such as keywords. For example, the user may desire that user data associated with a first website (e.g., identified by the selective data sharing application 20 from a preferred site list or determined based on filter data and/or keywords) is sent to the target device 16, and user data associated with a second website (e.g., a blocked or disliked site list determined based on filter data and/or keywords) is not sent to the target device 16. As such, when the user data 22 is associated with the first website or includes certain keywords, the processor 30 determines that the one or more target devices 16 associated with the first website are authorized to receive the encryption key 40. Further, when the processor 30 determines that the one or more target devices 16 are authorized to receive the encryption key 40, the processor 30 sends the encryption key 40 to the one or more target devices 16, as shown at block 62. However, if the one or more target devices 16 are not authorized, the processor 30 may take no further action until a subsequent indication to send user data is received, at block 52.

In this manner, the process 50 may enable the user device 12 to selectively send an encryption key 40 associated with user data 22 based on a determination of whether one or more target devices 16 that received the user data 22 are authorized to receive the encryption key 40, thus allowing the user to select which third parties may utilize the unencrypted data for analytics and/or determining targeted content or advertisements to send to the user device 12. As discussed herein, this protects the privacy of the user and may prevent the user from receiving unwanted targeted content or advertisements.

FIG. 4 illustrates an example process 70 that may be employed by the user device 12 to selectively send the encryption key 40 associated with user data 22 based on whether a set price for the user data 22 has been accepted, in accordance with embodiments described herein. For example, the steps of the process 70 may be stored in the selective data sharing application 20. Before proceeding, it should be noted that the process 70 described below is described as being performed by the processor 30 of the user device 12, but the process 70 may be performed by other suitable computing devices. Although described in a particular order, which represents a particular embodiment, it should be noted that the process 50 may be performed in any suitable order. Additionally, embodiments of the process 50 may omit process blocks and/or include additional process blocks.

At block 72, the processor 30 sets a price associated with user data 22. For example, the price may be set based on input provided by the user, determined by the user device, and/or provided by a third-party user associated with the third-party device. The price may include dollars, cents, fraction of cents (e.g., 0.1 cents, 0.01 cents, 0.001 cents, 0.0001 cents, and the like), and/or a percentage of profits gained by the third party based on their utilization of the data. For example, the processor 30 may provide or output an expected profit by the third party based the user data (e.g., $0.10), and set the price to a fraction of the profit (e.g., 10% of $0.10 or $0.001). In some embodiments, the user device 12 may prompt the user to provide a price using an input device (e.g., I/O Device 38) for the user data. In some embodiments, the user device 12 may prompt the user to provide a price based on the type of information within the user data 22. For example, the user may provide an input that indicates a first price for demographic data, a second price for temporal data, and a third price for location data indicative of a region where the user resides.

As discussed herein, the processor 30 may set the prices using a bid system. That is, the user device 12 may send the encryption key to a third party that provides the highest bid for the user data 22 or exceeds a target or minimum price provided by the user within a time frame. For example, the user may provide a target or minimum price to sell the user data 22 and a time frame for selling the user data 22. As such, at the end of the time frame, the user device 12 may send the encryption key 40 to the target device 16 associated with the third party that provided the highest bid or a bid that exceeded the minimum price provided by the user. In some embodiments, the user device 12 may transmit the user data 22 at a particular price point. That is, the user device 12 may transmit the encryption key 40 when the bid is greater than or equal to the particular price point. In some embodiments, the processor 30 may determine to transmit the encryption key 40 based on a stock market analysis associated with the user data 22. For example, a price associated with the user data 22 may rise and fall periodically based on a demand for the data, temporal data, location data, demographic data, and the like. As such, the processor 30 may determine to transmit the user data 22 when the price reaches a threshold or when the price drops below a certain threshold (e.g., a stop-loss order) to mitigate potential losses.

At block 74, the processor 30 receives an indication to send user data 22. In general, the indication may be similar to the indication discussed above with respect to block 52 of FIG. 3. At block 76, the processor 30 generates an encryption key 40 associated with the user data in a similar manner as discussed above with respect to block 54 of FIG. 3. In other embodiments, the control system 20 may generate the encryption key 40 each time user data is generated. At block 78, the processor 30 encrypts the user data 22 using the encryption key 40 as discussed herein and with respect to block 56 of FIG. 3. At block 80, the processor 30 sends the encrypted user data to one or more target devices 16 as discussed herein with respect to block 62 of FIG. 3

At block 82, the processor 30 determines whether a set price has been accepted. For example, when the price is set by the user, the processor 30 may determine whether an input received from a target device 16 is indicative of the third party accepting the price set by the user. As another non-limiting example, when the price is set by a third-party user, the processor 30 may determine whether the user provides an input indicative of the user accepting the price set by the third party. In some embodiments, the processor 30 may receive a bid from one or more target devices 16, such as a proposed price that the third-party user is willing to pay for the user data. Once the processor 30 receives the bid, the processor 30 may compare the bid to the price set for the user data. When the bid is greater to or equal to the price set for the user data, the processor 30 may proceed to block 84. However, when the bid is less than the price set for the user data, the processor 30 may return to block 74.

At block 84, the processor 30 may send the encryption key 40 to the target device 16 when the price is accepted. For example, when the processor 30 determines that the bid price is greater than or equal to the set price, the processor 30 may send the encryption key 40.

In this manner, the process 70 may enable the user device 12 to selectively send an encryption key 40 associated with user data 22 based on whether a set price for the user data 22 has been accepted, thus allowing the user to select which third parties may utilize the unencrypted data for analytics and/or determining targeted content or advertisements to send to the user device 12. As discussed herein, doing so may protect the privacy of the user and prevent the user from receiving unwanted targeted content or advertisements.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An electronic device, comprising:
   one or more processors;
   a tangible, non-transitory, computer-readable medium storing instructions that, when executed by the one or more processors, cause the one or more processors to:
      receive an indication to send user data to a target device;
      set a price for the user data based on a type of the user data;
      generate an encryption key associated with the user data based on the indication;
      encrypt the user data with the encryption key to generate encrypted user data;
      send the encrypted user data to the target device; and
      send the encryption key to the target device based on:
         the target device being authorized to receive the encryption key, the type of the user data, or both; and
         the price being accepted by a third party associated with the target device.

2. The electronic device of claim 1, wherein the instructions are configured to cause the one or more processors to:
   determine a time period associated with when the user data was generated;
   determine that the time period falls within a predetermined time range; and
   send the encryption key based on the time period being within the predetermined time range.

3. The electronic device of claim 2, wherein the predetermined time range corresponds to when a user associated with the user data is working.

4. The electronic device of claim 2, wherein the predetermined time range corresponds to hobbies of a user associated with the user data.

5. The electronic device of claim 1, wherein the type of user data comprises a type of product, an advertisement for the product, a notification of an upcoming release of the product, or any combination thereof.

6. The electronic device of claim 1, wherein the instructions are configured to cause the one or more processors to:
   determine an amount of memory used to store the encryption key and one or more additional encryption keys; and
   send the encrypted user data based on the amount of memory used to store the encryption key and the one or more additional encryption keys being above a threshold.

7. The electronic device of claim 1, wherein the instructions are configured to cause the one or more processors to:
   determine a location where the user data was generated; and
   send the encryption key based on the location where the user data was generated.

8. The electronic device of claim 7, wherein the instructions are configured to cause the one or more processors to:
   determine a time period associated with when the user data was generated; and
   send the encryption key based on the location where the user data was generated and the time period when the user data was generated.

9. The electronic device of claim 1, wherein the instructions are configured to cause the one or more processors to:
   generate the user data in response to one or more actions performed by a user using the electronic device, wherein in the one or more actions comprise selecting a hyperlink, opening a webpage, selecting actionable content displayed on an application, or any combination thereof; and
   receive the indication in response to generating the user data.

10. A method, comprising:
    receiving, via one or more processors, an indication to send user data to a target device, the user data comprising temporal data and demographic data;
    generating, via the one or more processors, an encryption key associated with the user data based on the indication;
    encrypting, via the one or more processors, the user data with the encryption key to generate encrypted user data;
    sending, via the one or more processors, the encrypted user data to the target device; and
    sending, via the one or more processors, the encryption key to the target device based on the target device being authorized to receive the encryption key, a price associated with the user data, or both, wherein sending the encryption key comprises setting, via the one or more processors, a temporal data price for the temporal data and a demographic data price for the demographic data.

11. The method of claim 10, wherein the user data indicates a product.

12. The method of claim 11, wherein sending, via the one or more processors, the encryption key to the target device comprises:
    determining, via the one or more processors, a vendor that sells the product;
    determining, via the one or more processors, a distance between a first location where the user data was generated and a second location of the vendor; and
    setting, via the one or more processors, the price based on the distance between the first location and the second location.

13. The method of claim 10, comprising storing, via the one or more processors, the encryption key in a memory.

14. The method of claim 10, comprising setting, via the one or more processors, the temporal data price based on an overlap between a time period when the user data was generated and fiscal periods of a company associated with the user data.

15. The method of claim 10, comprising:
    receiving user input indicating that the target device is authorized to receive the encryption key, wherein the user input comprises filter data indicative of certain types of data that a user has authorized to transmit to the target device; and
    determining to send the encryption key in response to determining that a payload of the user data correlates to the filter data.

16. A tangible, non-transitory, machine-readable medium comprising instructions that, when executed by a processor, cause the processor to:
    receive an indication to send user data to a target device;
    generate an encryption key associated with the user data based on the indication;
    encrypt the user data with the encryption key to generate encrypted user data;
    send the encrypted user data to the target device; and
    send the encryption key to the target device based on the target device being authorized to receive the encryption key and a type of the user data, wherein sending the encryption key to the target device comprises setting a price associated with the user data based on a percentage of profits that a third party associated with the target device gains based on the user data.

17. The tangible, non-transitory, machine-readable medium of claim 16, wherein the user data comprises temporal data and demographic data, and wherein setting the price associated with the user data is based on the temporal data and the demographic data.

18. The tangible, non-transitory, machine-readable medium of claim 16, wherein the instructions that cause the processor to send the encryption key to the target device comprise:

determining that the type of user data indicates a product that a user associated with the user data intends to purchase;
   determining that the target device is associated with a vendor that sells the product; and
   sending the encryption key to the target device based on the target device being associated with the vendor.

19. The tangible, non-transitory, machine-readable medium of claim 16, wherein the user data is associated with one or more actions comprise selecting a hyperlink, opening a webpage, selection actionable content displayed on an application, or any combination thereof.

20. The tangible, non-transitory, machine-readable medium of claim 16, wherein the instructions cause the processor to:

determine an amount of memory used to store the encryption key and one or more additional encryption keys; and
   send the encrypted user data in response to determining that the amount of memory used to store the encryption key and the one or more additional encryption keys is above a threshold.

\* \* \* \* \*